L. E. OLSEN.
ADJUSTABLE LIMIT GAUGE.
APPLICATION FILED JULY 26, 1920.
1,414,484.
Patented May 2, 1922.
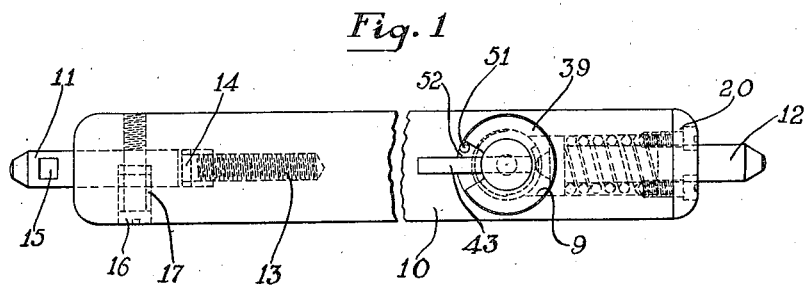
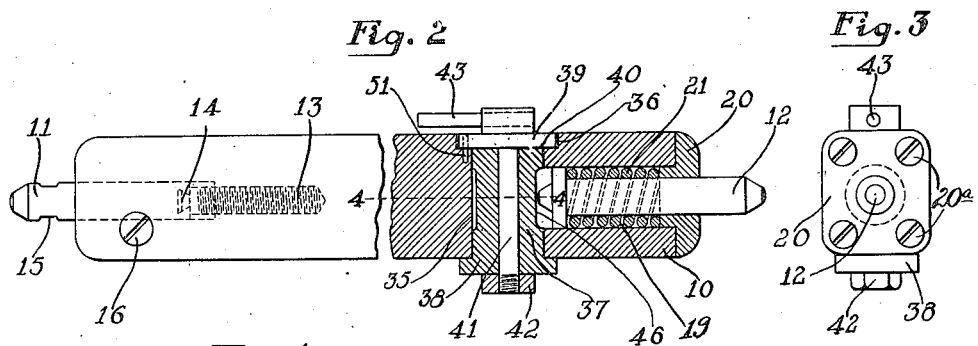
Inventor
Lawrence C. Olsen
By S. Jay Teller
Attorney

UNITED STATES PATENT OFFICE.

LAWRENCE E. OLSEN, OF TROY, NEW YORK, ASSIGNOR TO PRATT & WHITNEY COMPANY, OF NEW YORK, N. Y., A CORPORATION OF NEW JERSEY.

ADJUSTABLE LIMIT GAUGE.

1,414,484.

Specification of Letters Patent. Patented May 2, 1922.

Application filed July 26, 1920. Serial No. 398,902.

*To all whom it may concern:*

Be it known that I, LAWRENCE E. OLSEN, a citizen of the United States, residing at Troy, in the county of Rensselaer and State of New York, have invented certain new and useful Improvements in Adjustable Limit Gauges, of which the following is a specification.

This invention relates to a linear gauge and in particular to a pin gauge adapted to be used to determine the dimensions of cylindrical holes or other internal dimensions. A gauge of the type to which the invention relates may be accurately adjusted to a standard dimension and also to a dimension slightly different from the standard dimension. A gauge of this type is covered by my copending application for adjustable limit gauges, Serial No. 398,901, filed on even date herewith.

One object of the invention is to provide a gauge of this type with easily operated rotatable means to change the distance between the contact pins of the gauge from the standard dimension to a dimension slightly different from the standard.

With this and other objects in view, my invention consists in the features of construction and operation set forth in the following specification.

It is to be understood that the present showing discloses but several specific constructions of gauges made in accordance with the present invention and that other constructions differing from these constructions are included within the spirit and scope of the invention as expressed in the appended claims.

In the drawing:

Figure 1 shows a longitudinal view of one embodiment of the present invention.

Fig. 2 is another view partly in section of the construction shown in Fig. 1.

Fig. 3 is an end view of the construction shown in Figs. 1 and 2.

Fig. 4 is an enlarged view in section of the sleeve taken on the line 4—4 of Fig. 2.

In the drawing, I have illustrated only a gauge adapted for determining internal dimensions for the reason that the invention is particularly applicable to gauges of this type, but it is to be understood that as concerns certain of its features, the invention is not so limited. A gauge embodying the invention comprises a frame and two opposed contact pins at opposite ends of the frame, one pin being freely movable longitudinally through a definite predetermined distance and the other pin preferably being longitudinally adjustable.

Referring more in detail to the drawing, 10 represents the gauge frame and 11 and 12 represent the two contact pins. When the gauge is intended for determining internal dimensions, the frame extends directly along straight lines from one pin to the other. As illustrated the frame is a straight bar of substantially rectangular cross section.

The pin 11 is preferably longitudinally adjustable with respect to the frame 10 and a screw 13 is provided for effecting the adjustment. The said screw is threaded into a hole in the frame 10 and is illustrated as having a dovetailed connection 14 with the pin. The pin is flattened at 15 so that it can be readily turned to effect adjustment. For locking the pin in adjusted position, there is provided a clamping screw 16 which engages a bushing 17 and forces it into clamping contact with the pin.

The pin 12 is freely movable longitudinally and carried by the frame is a manually operable means for controlling or effecting the movement of the pin. The pin 12 is mounted in hole 19 formed in the frame, this hole being closed by an apertured cap 20. This cap 20 is preferably secured rigidly in position by means of a plurality of screws 20ª as shown in Fig. 3. A spring 21 is interposed between the cap 20 and a collar on the pin, this spring serving to force the pin inward.

The means for moving the pin 12 is constructed and positioned as follows: A cylindrical hole 35 is formed in the frame, this hole being counterbored as shown at 36. Rotatably mounted within the hole 35 is a sleeve 37 having a head 38 which takes up against one side of the frame 10. At the opposite end of the sleeve 38 is a head 39 which fits into the counterbore 36 and engages the sleeve at 40. A screw 41 is formed on the head 39 and extends through the sleeve 37 and is engaged at the other end by a nut 42. This screw and nut serve to hold the head and sleeve in engagement with each other. Carried by the head 39 is a handle 43 whereby the head and the sleeve may be readily turned. As shown most clearly in Fig. 4, the sleeve 37 is formed with a plurality (preferably three or more) of fragmentary concentric cylindrical surfaces 44, 45, 46, 47, 48 and 49 of different radii, these surfaces being connected by short eccentric cam surfaces 50. The inner end of the pin 12 engages one or another of the cylindrical surfaces of the sleeve and it will be seen that when the sleeve is turned the pin is moved inward or outward through a definite distance from one definite position to another definite position. The surfaces 44 to 49 serve as stops for determining the limits of movement of the pin. The distances of movement between each two adjacent surfaces are different, they preferably being successively less as the sleeve is turned or adjusted. For instance, the distance between the surfaces 44 and 45 may be five thousandths of an inch; between the surfaces 45 and 46, four thousandths, etc. Thus by moving the sleeve in opposite directions so that the pin is engaged by the surfaces 44 and 45 the pin is moved to an extent corresponding to a certain predetermined tolerance. By adjusting the sleeve so that the pin is engaged by other surfaces, as, for instance, the surfaces 47 and 48, a lesser movement is effected which corresponds to a lesser predetermined tolerance.

In order that the operator may conveniently move the sleeve and limit the movement so that the pin will cooperate with only two surfaces, I provide an adjustable stop mechanism which includes a screw, which may be the screw 41 already described. As illustrated, there is a stop pin 51 which projects into a notch 52 formed in the head 39. It will be clear that this pin engaging the sides of the notch limits the turning movement of the head and of the sleeve. By loosening the nut 42 on the screw 41 the sleeve may be turned with respect to the head, thus making it possible to bring any two of the surfaces 44 to 49 into operative relation with the pin 12. Then by tightening the nut on the screw the stop is again made operative in a new relative position.

It will be seen that in accordance with my invention, I have provided a limit gauge in which a single pin at one end of the gauge is movable into two different and distinct positions corresponding respectively to the maximum and minimum permissible dimensions. The first position is the "not go" position and the second position is the "go" position. A gauge of this type has distinct advantages over a gauge having two fixed pins at definite positions. Clearly if there were two such fixed pins, the "not go" pin would prevent the "go" pin from entering into a hole except for a certain very limited distance; but with my improved gauge the diameter or dimension of a deep hole can be tried at all parts thereof not only as concerns the permissible minimum but also as concerns the permissible maximum.

What I claim is:

1. A gauge for determining dimensions comprising in combination, a frame, a contact pin at one end of the frame, a contact pin at the other end of the frame and movable inward or outward with respect thereto, means for moving the movable pin comprising an element rotatable about an axis perpendicular to the said pin and having an eccentric cam surface engaging the pin, and means associated with the said moving means for limiting the said movement of the pin.

2. A gauge for determining dimensions comprising in combination, a frame, a contact pin at one end of the frame, a contact pin at the other end of the frame and movable inward or outward with respect thereto, two stops for determining the limits of movement of the movable pin, means for moving the said pin from one limit position to the other comprising an element rotatable about an axis perpendicular to the said pin and having an eccentric cam surface engaging the pin.

3. A gauge for determining dimensions comprising in combination, a frame, a contact pin at one end of the frame, a contact pin at the other end of the frame and movable inward or outward with respect thereto, means for moving the movable pin comprising an element rotatable about an axis perpendicular to the said pin and having an eccentric cam surface engaging the pin, and means associated with the said rotatable element for limiting the rotative movement thereof.

4. A gauge for determining dimensions comprising in combination, a frame, a contact pin at one end of the frame, a contact pin projecting outward at the other end of the frame and movable inward or outward with respect thereto, means for moving the last said pin comprising an element rotatable about an axis perpendicular to the said pin and in engagement therewith, the said element having a plurality of segmental cylindrical surfaces concentric with the axis of rotation and of different radii and also having one or more eccentric cam surfaces connecting the cylindrical surfaces.

5. A gauge for determining dimensions comprising in combination, a frame, a contact pin at one end of the frame, a contact pin projecting outward at the other end of the frame and movable inward or outward with respect thereto, means for moving the last said pin comprising an element rotatable about an axis perpendicular to the said pin and in engagement therewith, the said element having three or more segmental cylindrical surfaces concentric with the axis of rotation and of different radii and also having one or more eccentric cam surfaces connecting the cylindrical surfaces, the difference in radii between each two adjacent cylindrical surfaces being greater or less than the difference between any other two adjacent surfaces.

6. A gauge for determining dimensions comprising in combination, a frame, a contact pin at one end of the frame, a contact pin projecting outward at the other end of the frame and movable inward or outward with respect thereto, means for moving the last said pin comprising an element rotatable about an axis perpendicular to the said pin and in engagement therewith, the said element having three or more segmental cylindrical surfaces concentric with the axis of rotation and of different radii and also having one or more eccentric cam surfaces connecting the cylindrical surfaces, means for limiting the rotative movement of the rotatable element so that only two adjacent cylindrical surfaces can be engaged with the pin, and means for adjusting the stop to vary the limits of rotative movement so that any two adjacent cylindrical surfaces can be engaged.

7. A gauge for determining dimensions comprising in combination, a frame, a contact pin at one end of the frame, a contact pin projecting outward at the other end of the frame and movable inward or outward with respect thereto, means for moving the last said pin comprising an element rotatable about an axis perpendicular to the said pin and in engagement therewith, the said element having three or more segmental cylindrical surfaces concentric with the axis of rotation and of different radii and also having one or more eccentric cam surfaces connecting the cylindrical surfaces, a notched head connected with the rotatable element, a pin entering the notch and serving to limit the movement of the head and of the rotatable element so that only two adjacent cylindrical surfaces can be engaged with the pin, and means whereby the rotatable element can be angularly adjusted with respect to the head so that any two adjacent cylindrical surfaces can be engaged.

8. A gauge for determining dimensions comprising in combination, a frame, a contact pin at one end of the frame, means for adjusting the said pin inward or outward and locking it in adjusted position, a contact pin at the other end of the frame and movable inward or outward with respect thereto, means for moving the movable pin comprising an element rotatable about an axis perpendicular to the said pin and having an eccentric cam surface engaging the pin, and means associated with the said moving means for limiting the said movement of the pin.

9. A gauge for determining internal dimensions comprising in combination, a frame, a contact pin projecting outward at one end of the frame, a contact pin projecting outward at the other end of the frame and movable inward or outward with respect thereto, the said frame extending directly along straight lines from one pin to the other, means for moving the movable pin comprising an element rotatable about an axis perpendicular to the said pin and having an eccentric cam surface engaging the pin, and means associated with the said moving means for limiting the said movement of the pin.

10. A gauge for determining internal dimensions comprising in combination, a frame, a contact pin projecting outward at one end of the frame, means for adjusting the said pin inward or outward and locking it in adjusted position, a contact pin projecting outward at the other end of the frame and movable inward or outward with respect thereto, the said frame extending directly along straight lines from one pin to the other, means for moving the movable pin comprising an element rotatable about an axis perpendicular to the said pin and having an eccentric cam surface engaging the pin, and means associated with the said moving means for limiting the said movement of the pin.

In testimony whereof, I hereto affix my signature.

LAWRENCE E. OLSEN.